United States Patent
Zhao et al.

(10) Patent No.: US 8,891,259 B2
(45) Date of Patent: Nov. 18, 2014

(54) CONTROL CIRCUIT AND METHOD FOR AUDIBLE NOISE SUPPRESSION IN A POWER CONVERTER

(75) Inventors: PingAn Zhao, Shanghai (CN); Huizhen Zhu, Shanghai (CN); Hu Wang, Shanghai (CN); Chao Gao, Shanghai (CN)

(73) Assignee: BCD Semiconductor Manufacturing Limited, Shanghai (CN)

( * ) Notice: Subject to any disclaimer, the term of this patent is extended or adjusted under 35 U.S.C. 154(b) by 366 days.

(21) Appl. No.: 13/198,981

(22) Filed: Aug. 5, 2011

(65) Prior Publication Data
US 2012/0293146 A1    Nov. 22, 2012

(30) Foreign Application Priority Data
May 18, 2011 (CN) .......................... 2011 1 0128586

(51) Int. Cl.
H02M 3/335 (2006.01)
H02M 1/00 (2006.01)
H02M 1/44 (2007.01)

(52) U.S. Cl.
CPC .. H02M 3/33507 (2013.01); H02M 2001/0032 (2013.01); Y02B 70/16 (2013.01); H02M 1/44 (2013.01)
USPC ...................................... 363/21.18; 363/21.12

(58) Field of Classification Search
USPC ................ 363/18, 19, 20, 21.01, 21.1, 21.12, 363/21.15, 21.16, 21.17, 21.18
See application file for complete search history.

(56) References Cited

U.S. PATENT DOCUMENTS

| | | | |
|---|---|---|---|
| 7,202,609 B2 | 4/2007 | Langeslag et al. | |
| 7,974,107 B2* | 7/2011 | Li et al. | 363/21.01 |
| 7,978,484 B2* | 7/2011 | Grant et al. | 363/21.18 |
| 2010/0061126 A1* | 3/2010 | Huynh et al. | 363/21.12 |
| 2011/0051470 A1* | 3/2011 | Ll et al. | 363/21.15 |

FOREIGN PATENT DOCUMENTS

CN          101645656      2/2010

OTHER PUBLICATIONS

China Intellectual Property Office office action for patent application CN201110128586.6 (Jan. 18, 2013).
China Intellectual Property Office office action for patent application CN201110128586.6 (Oct. 18, 2013).

* cited by examiner

Primary Examiner — Nguyen Tran

(57) ABSTRACT

A control circuit is configured for controlling a power switch to regulate an output of a power converter. The control circuit is configured to increase a switching frequency of the power switch when a first signal representing a magnitude of the power converter is below a first output level. In some embodiment, the first output level is selected such that when the first signal is below the first output level, the power converter may generate audible noise. In an embodiment, when the first signal is above the first output level, the control circuit is configured to turn off the power switch when a second signal representing a current in the power switch is above a first reference level. On the other hand, when the first signal is below the first output level, the control circuit is configured to turn off the power switch if the second signal reaches a lower reference level.

10 Claims, 4 Drawing Sheets

CONTROL CIRCUIT AND METHOD FOR AUDIBLE NOISE SUPPRESSION IN A POWER CONVERTER

CROSS-REFERENCES TO RELATED APPLICATIONS

This application claims priority to Chinese Patent Application No. 201110128586.6, filing date May 18, 2011, commonly assigned, incorporated by reference herein for all purposes.

BACKGROUND OF THE INVENTION

The present invention relates generally to the field of switch mode power supply (SMPS). More particularly, embodiments of the present invention relate to circuits and method for suppressing audible noise in switch mode power converters.

Electronic and magnetic devices, such as a switch mode power supply (SMPS), can generate audible noises when the switching frequency is in the audible range, e.g., below 20 kHz. Under many conditions, audible noise is often not acceptable. In pulse frequency modulation (PFM) converters, audible noise can be generated under low load conditions. In certain applications, audible noise can be reduced using optimization at system level, such as by lowering the maximum flux density of the transformer. Alternatively, audible noise can also be reduced using techniques at chip level.

Conventional chip level solutions are often not satisfactory. For example, U.S. Pat. No. 6,011,361 describes a buck converter for igniting and operating a high-pressure discharge lamp, in which the maximum off time of the transistor switching the converter can be set preventing operations below 20 kHz. These limitations are set all the time irrespective of if the switching frequency is high or low. Specifically, the off time has an upper limit of 36 µs and a lower limit of 5 µs. With regard to audible noise, the switch is turned on if a time limit for the off time is reached.

In another example, U.S. Pat. No. 7,202,609 describes a fly-back converter, in which the frequency of the transistor controlling the converter is monitored by using a timer to measure the period of the switch transistor, and the switching frequency is prevented from falling below 20 kHz. When the frequency reaches an audible level, the frequency is increased by turning off the transistor sooner, i.e., at a lower current level, by adding an extra voltage to the voltage across the current sense resistor. The extra voltage is provided by an internal current source.

These conventional techniques tend to be inflexible, unable to handle different load conditions, and often increase the cost of the system. Therefore, improved techniques for suppressing audible noise in switch mode power supplies are desirable.

BRIEF SUMMARY OF THE INVENTION

Embodiments of the present invention provide techniques that can be used to suppress audible noise in a switching mode power supply. Embodiments of the invention include circuits, methods, and power supplies, etc., using these techniques. In various embodiments, the switching frequency of the power switch in the power supply is raised when the output is in the audible noise generation range, but the control circuit is still configured to regulate the power supply at the target output. In some embodiments, a low output range is identified as an audible noise generation range in which when a signal representing the magnitude of the output of the power converter is below a certain output reference level. In other embodiments, the audible noise generation range excludes the very low output range, in which the power output is so low that the audible noise level may be acceptable in some applications. The very low output range is determined by a second output reference level. In some embodiments, the off time of the switch is not used to measure the switching frequency. Rather, the output load of the power supply is monitored, and a load signal is scaled for regulating the power supply and suppressing the audible noise.

A control circuit according to embodiments of the present invention is configured for controlling a power switch to regulate an output of a power converter. The control circuit is configured to increase a switching frequency of the power switch when a first signal representing a magnitude of the output of the power converter is below a first output level. In some embodiment, the switching frequency is increased, but the pulse width is reduced, so the power supply can still to maintain the same desired target output.

In some embodiments of the above control circuit, the first output level is selected such that when the first signal is below the first output level, the power converter may generate audible noise. In an embodiment, when the first signal representing the magnitude of the output of the power converter is above the first output level, the control circuit turns off the power switch when a second signal representing a current in the power switch is above a first reference level. Also, when the first signal is below the first output level, the control circuit turns off the power switch if the second signal is above a second reference level. In a specific embodiment, the second reference level is lower than the first reference level.

According to another embodiment of the invention, a pulse frequency modulated (PFM) control circuit for regulating an output of a power converter uses a control pulse signal that has a variable frequency. When a first signal representing the output of the power converter is above a first output level, the control circuit is configured to maintain the control pulse signal at a first pulse width. And when the first signal is below the first output level, the control circuit is configured to maintain the control pulse signal at a second pulse width.

In another embodiment, a control circuit for regulating an output of a power converter includes a power switch. When a first signal representing an output of the power converter is above a first output level, the control circuit is configured to turn off the power switch if a second signal representing a current in the power switch is above a first reference level. When the first signal is below the first output level, the control circuit is configured to turn off the power switch if the second signal is above a second reference level, the second level being lower than the first level.

In another embodiment, a control circuit for a power converter includes means for controlling a switching frequency of a power switch to regulate an output of the power converter and means for determining a first signal representing a load of the power converter. The control circuit also includes means for raising the switching frequency of the power switch when the first signal is below a reference level.

According to another embodiment, a method for controlling a power converter includes varying a switching frequency of a power switch to regulate an output of the power converter, determining a first signal representing a load of the power converter, and raising the switching frequency of the power switch when the first signal has dropped below a reference level.

In an embodiment of the above method, when the first signal is below the first level, the power switch is susceptible to audible noise generation. In a specific embodiment, the method also includes determining a second signal representing a current in the power switch. In this embodiment, the power switch is turned off when the second signal is above a first level, if the first signal is above a first output level. On the other hand, the power switch is turned off when the second signal is above a second level, if the first signal is below a first output level.

According to yet another embodiment, a switched mode power supply (SMPS) includes a primary winding for coupling to an input voltage, a secondary winding for providing an output of the SMPS, and a power switch coupled to the primary winding for controlling a current flow through the primary winding. The power supply also has a control circuit coupled to the power switch for regulating the output of the SMPS. The control circuit is configured to increase a switching frequency of the power switch when a first signal representing the output of the SMPS is below a first output level.

Embodiments of the present invention can provide one or more of the following benefits over conventional techniques. For example, in various embodiments, no extra components are required in the power supply, which enables cost-effective implementation of the control device and converter. The frequency of the switch is modified in a predictable way under various load conditions. In some embodiments, in the very low output range, the switching frequency is not raised, thus maintaining low standby power consumption.

A further understanding of the nature and advantages of the present invention may be realized by reference to the remaining portions of the specification and the drawings.

DETAILED DESCRIPTION OF THE INVENTION

Merely for illustration, some embodiments of the present invention are described below using examples of fly-back converters for AC/DC or DC/DC conversion. However, embodiments of the invention are not limited to limited to such converters. For example, embodiments of the present invention can be applied to any converters in which the audible noise might be generated, or in which certain output load conditions require specific handling.

The description below is presented with reference to a series of drawing figures enumerated above. These diagrams are merely examples, and should not unduly limit the scope of the claims herein. In connection with the various aspects illustrated and described, one of ordinary skill in the art would recognize other variations, modifications, and alternatives.

Figure 1:
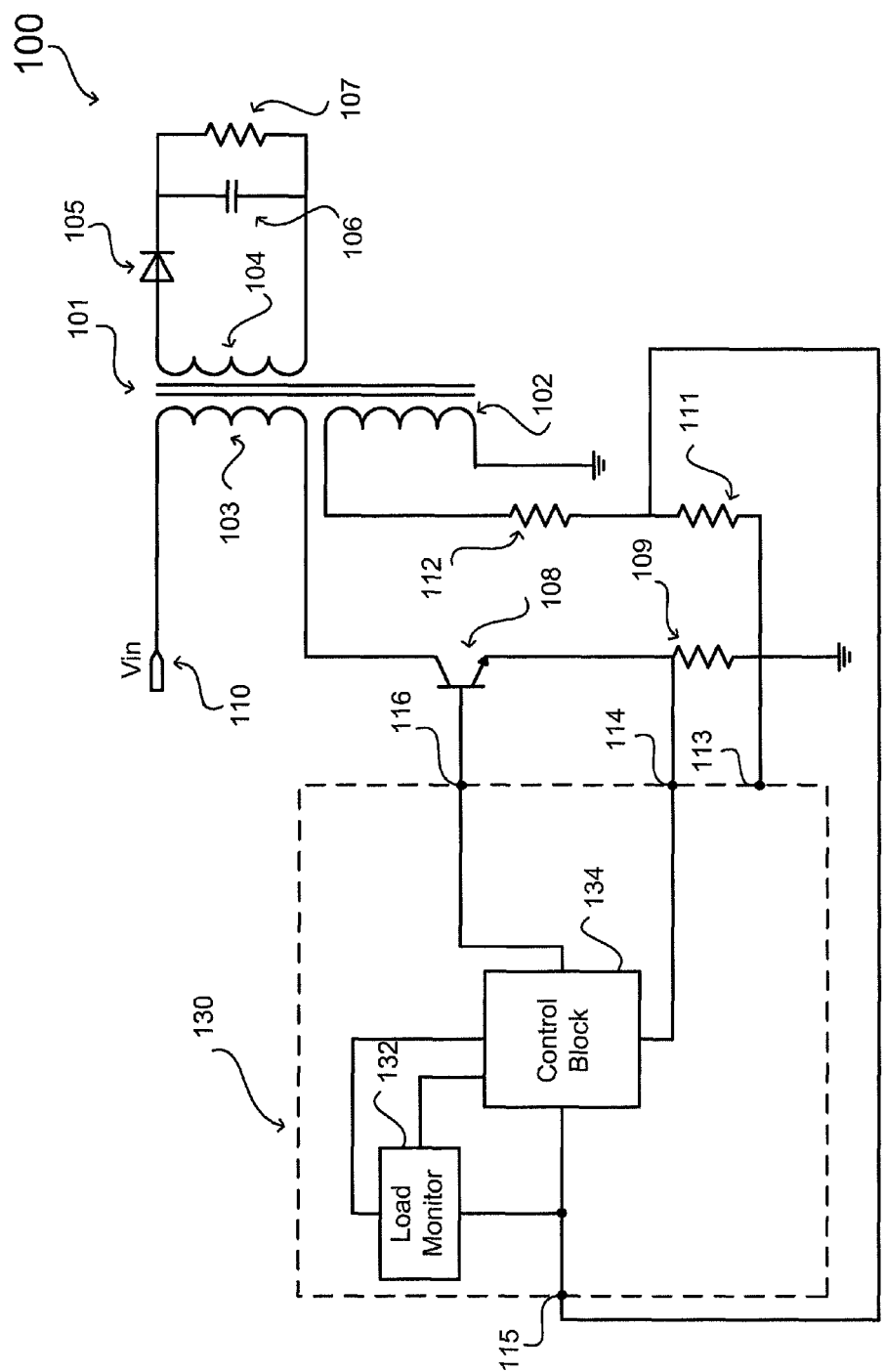
FIG. 1 is a simplified block/schematic diagram illustrating a power supply with a controller according to an embodiment of the present invention.

FIG. 1 is a simplified block/schematic diagram illustrating power supply 100 including a power supply controller 130 according to an embodiment of the present invention. As shown, switched mode power supply (SMPS) 100 has a transformer 101, which includes a primary winding 103 for coupling to an input voltage 110 (Vin). In a specific embodiment, input voltage 110 (Vin) may be a DC voltage provided by an AC power supply through a rectifying circuit (not shown), but could also be provided by a DC voltage source. SMPS 100 also has a secondary winding 104 for providing an output of the SMPS, which is configured to provide a constant output, e.g., current or voltage, at load 107. Here, load resistor 107 can represent various load devices, for example, a charging circuit for a portable electronic device, an LED lighting device, or any other types of electronic devices. In the example of FIG. 1, secondary winding 104 is coupled to an output rectifying circuit including a diode 105 and a capacitor 106.

As shown in FIG. 1, power supply 100 also includes a power switch 108 coupled to primary winding 103 for controlling a current flow through the primary winding. Control circuit 130 is coupled to power switch 108 for regulating the output of SMPS 100. Power supply 100 also has an auxiliary winding 102 coupled to secondary winding 104 for providing a feedback signal representing an output of the power supply through a voltage divider including resistors 111 and 112.

In power supply 100 of FIG. 1, control circuit 130 is configured to regulate the output of the power supply by controlling the on-off of power switch 108 to vary the current through primary winding 103 of the transformer. In some embodiments, control circuit 130 can be configured to maintain a constant output voltage of the power supply. In some embodiments, control circuit 130 can be configured to maintain a constant output current of the power supply. In other applications, control circuit 130 can be configured to maintain a constant output current under certain operating conditions and to maintain a constant output voltage under another operating conditions.

In certain embodiments, control circuit 130 may operate under pulse width modulation (PWM) and provides a control pulse signal having a pulse width that varies depending on the demand of the output load. In PWM control circuits, the control pulse signal may have a fixed switching frequency. In other embodiments, control circuit 130 may operate under pulse frequency modulation (PFM) and provides a control pulse signal with a switching frequency that varies depending on the demand of the output load. In PFM control circuits, the control pulse signal may have a fixed pulse width.

In power supply 100 in FIG. 1, the output of the converter is controlled by regulating the on-off time of switch 108, which can be a bipolar or MOS power transistor, using the controller 130. Under the PFM operation of discontinue current mode, the conduction time of current through switch 108 is set to be constant under different loads while the switching frequency is varied with the load. In this arrangement, the PFM control pulse signal has a constant pulse width. The load condition is provided to controller 130 at feedback input 115 to regulate the output of the power supply. In the example of FIG. 1, the feedback signal is provided by sensing the current of auxiliary winding 102 of the transformer. In alternative embodiments, the feedback signal can be provided or by some other suitable means.

As shown in FIG. 1, Controller 130 is configured to turn on power switch 108 with a control pulse signal in response to the feedback signal received at node 115. In some embodiments, this control pulse signal is turned off when the current through the power switch reaches a reference level, e.g., by comparing the voltage across sense resistor 109, at node 114, with a reference voltage of Vref-cs (shown in FIGS. 3 and 4). In some embodiments, this control pulse signal may have a fixed pulse width. When switch 108 is turned off, the energy stored in the magnetic field in transformer 101 is converted in to a current in the secondary circuit that charges output capacitor 106, where the output voltage and current is provided to load 107.

If the load is large, power switch 108 needs to be turned on more frequently to supply more current to the secondary circuit. When the load becomes smaller, the switching frequency decreases. In a conventional PFM power supply, when the output load decreases, the switching frequency of the power switch also decreases. In normal operation, the power supply may be designed to operate with switching frequency above the audible frequency range. However, the switching frequency can drop under certain conditions, for example, when the output load is light, when an open-circuit exists in the system, or when the power supply is unstable. If the switching frequency drops below an audible frequency, e.g., 20 KHz, and audible noise may be generated.

Embodiments of the present invention provide circuits and methods that can mitigate audible noise in a switch mode power supply. In some embodiments, the power supply includes a control circuit for controlling a power switch, wherein the control circuit is configured to increase a switching frequency of the power switch when the magnitude of the power converter output current or voltage is below a certain output level. When the output is below this output level, the power converter may generate audible noise. At such low output level, the switching frequency of the power switch is increased to above the audible range so that audible noise is not detectable, but the controller is still configured to maintain the desired output.

In a specific embodiment, a pulse frequency modulated (PFM) control circuit is configured for regulating an output of a power converter using a control pulse signal that has a variable frequency. When a signal representing the output of the power converter is above a selected output level, the control circuit is configured to maintain the control pulse signal at a first pulse width. When the first signal is below the first output level, the control circuit is configured to maintain the control pulse signal at a second pulse width, which is narrower than the first pulse width.

An example of the control circuit is described below with reference to FIGS. 1-4. In FIG. 1, only a portion of control circuit 130 is shown to illustrate the operation of audible noise reduction circuit, whereas other portions of the control circuit for conventional PFM control are omitted. As shown in FIG. 1, control circuit 130 has a load monitor block 132 and a control block 134. In an embodiment, load monitor block 132 is configured to determine a first signal representing the magnitude of the output of the power converter. After the power switch is turned on to supply a current to the secondary side, control block 134 is configured to determine when to turn off the power switch by using two different reference output levels. In an embodiment, when the first signal is above the first output level, the power switch is turned off if a second signal representing a current in the power switch is above a first reference level. And, when the first signal is below the first output level, the control circuit is configured to turn off the power switch if the second signal is above a second reference level.

Figure 2:
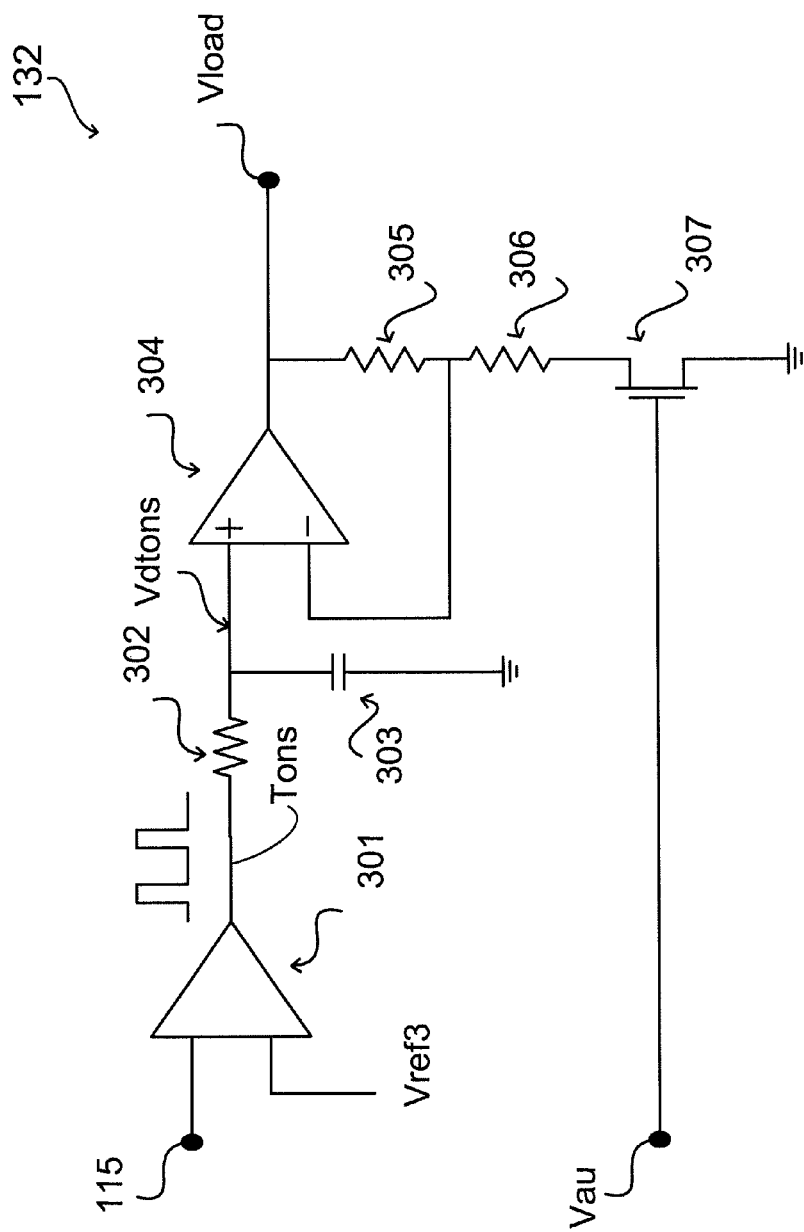
FIG. 2 is a schematic diagram illustrating a load monitor of the controller in the power supply of FIG. 1.

FIG. 2 is a schematic diagram illustrating load monitor 132 of the controller in power supply 100 of FIG. 1. Load monitor 132 is configured for generating a signal representing a magnitude of the output of the power converter. As shown in FIG. 2, load monitor 132 includes a first terminal 115 for receiving a feedback signal associated with the output of the power converter output. As used herein, reference numerals 113, 114, 115, and 116 can denote both a terminal node and the signal associated with the terminal. In the embodiment of FIG. 1, feedback input 115 is derived from the secondary winding 102. For regulating the power supply, feedback input 115 is sampled and held by a sample-and-hold circuit (not shown) to indicate whether more power needs to be supplied to the secondary circuit. In this embodiment, feedback input at 115 is also used to monitor the load status. In a preferred embodiment, load monitor 132 also includes a comparator circuit 301 for comparing the feedback signal with a feedback reference signal Vref3. In some embodiments, Vref3 is selected to help distinguish Tons time at the output of comparator 301 from the feedback signal 115 of the output of the system. For example, in a specific embodiment, Vref3 is selected to be 0.1V. At the output of comparator 301, the duty cycle of Tons is equal to the fraction of the conduction time of current through secondary winding to corresponding switch period.

In FIG. 2, an integrator circuit, with resistor 302 and capacitor 303, is coupled to the pulsed signal Tons at the output of comparator 301 to generate an analog signal Vdtons. A second comparator circuit 304 is coupled to the integrator circuit to receive signal Vdtons and for providing signal Vload, which represent a magnitude of the output of the power converter. Comparator circuit 304 has a first terminal for receiving the analog signal Vdtons and a second terminal for receiving a feedback signal from a voltage divider circuit that includes resistors 305 and 306 coupled in series with a transistor 307. It can be seen from FIG. 2 that transistor 307 is controlled by a state signal Vau. In the embodiment of FIG. 2, signal Vau indicates whether the load is in a range where audible noise is generated and, therefore, whether the switching frequency of the power switch needs to be raised. When Vau is low, i.e., when the power supply is operating in the audible noise generation range, transistor 307 is off, and Vload is set to equal to Vdtons. On the other hand, when Vau is high, i.e., when the power supply is outside the audible noise generation range, transistor 307 is on, and Vload=K*Vdtons, where K=(R306+R305)/R306.

The generation of signal Vau is described below with reference to control block 134 depicted in FIG. 3. In some embodiments, the control circuit is configured to increase a switching frequency of the power switch when the audible noise range is indicated by the signal representing a magnitude of the power converter (Vload) being below a first output level. In some embodiments, the control circuit is configured to increase a switching frequency of the power switch when the audible noise range is indicated by the signal representing a magnitude of the power converter (Vload) being below a first output level and above a second output level.

Figure 3:
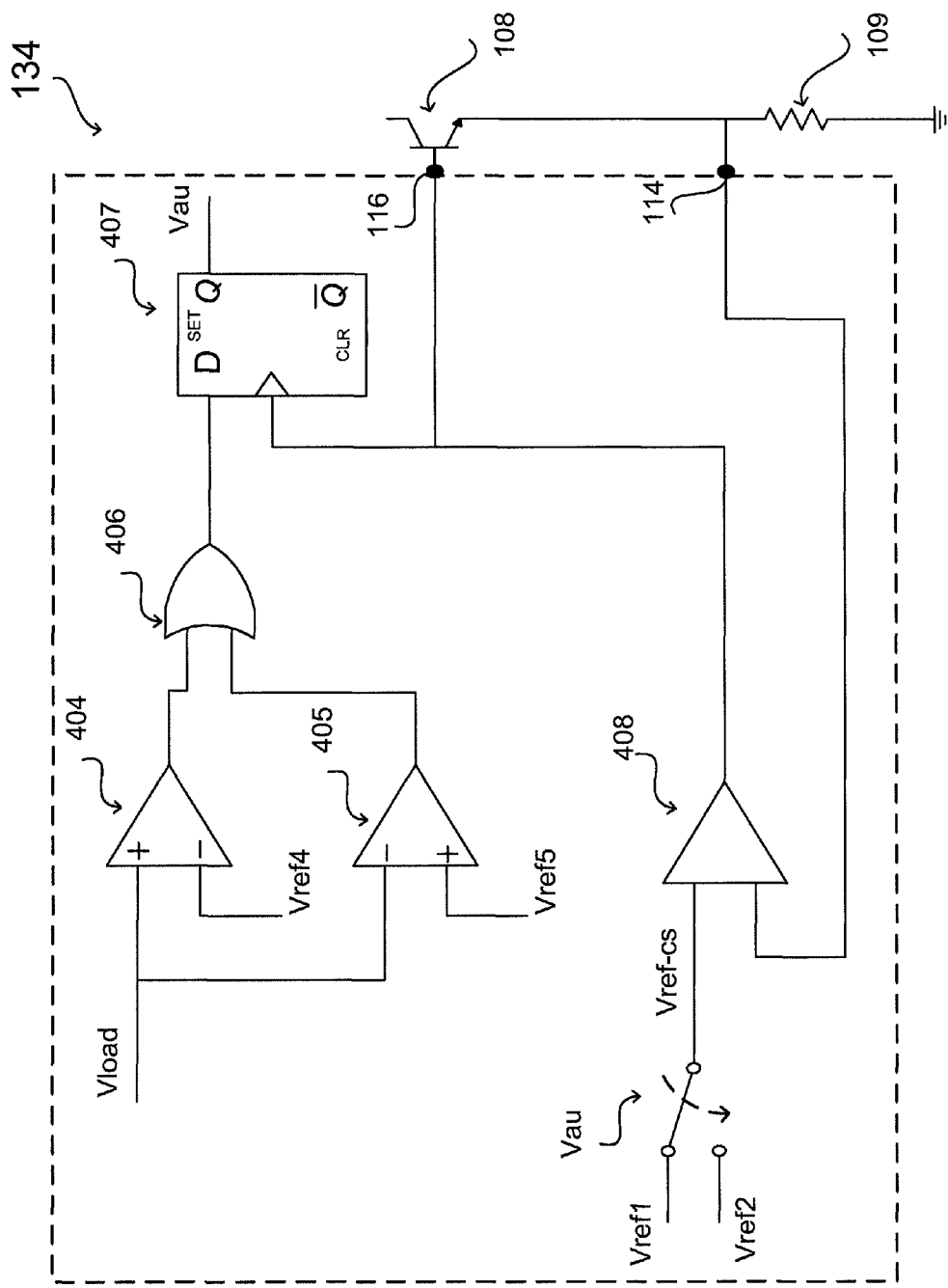
FIG. 3 is a schematic diagram illustrating a portion of the control circuit of the power supply controller in the power supply of FIG. 1.

FIG. 3 is a schematic diagram illustrating control block 134 of control circuit 130 of the power supply controller in the power supply of FIG. 1. As shown in FIG. 3, control circuit block 134 includes comparators 404, 405, and 408, an OR gate 406, and a D flip-flop 407. For illustration purposes, FIG. 3 also shows power switch 108 and current sense resistor 109 from power converter 100 of FIG. 1. It can be seen that the output signal 116 of comparator 408 is also the control signal for turning power switch 108 off. In some embodiments, controller 130 operates as a PFM controller in which the control pulse signal 116 has a fixed pulse width. Current sense signal 114 coupled to sense resistor 109 represents the current flow through power switch 108 and, therefore, through primary winding 103 of power converter 100 in FIG. 1. Here, comparator 408 compares current sense signal 114 with a current sense reference signal Vref-cs to determine when to turn off the power switch. In embodiments of the invention, under high load conditions, e.g., when no audible noise is generated, Vref-cs is connected to reference level Vref1 for turning off the control pulse signal 116 to power switch 108.

In FIG. 3, the Vload signal from load monitor 132 of FIG. 2 is compared with load reference signals Vref4 and Vref5 in comparators 404 and 405, respectively. Here, load reference signal Vref4 is selected to be a load level below which audible noise may be generated, and the switching frequency of the power switch needs to be raised to avoid the audible noise. In some embodiments, Vref 4 can be selected empirically.

According to embodiments of the present invention, under very low load conditions, the audible noise may not be pronounced or even detectable, and there is no need to raise the switching frequency. Raising the switching frequency under very low load conditions, for example, at stand by, may increase the power consumption of the system. Therefore, in some embodiments, such as in the embodiment of FIG. 3, Vload is also compared to a second, lower, load reference signal Vref5. The switching frequency is raised only when the output load is lower than Vref4 and above Vref 5. Here, Vref5 is a low load reference level, below which the audible noise may become negligible. In some embodiments, Vref 5 can be selected empirically.

In FIG. 3, if voltage signal Vload is less than reference voltage Vref4 and greater than reference voltage Vref5, the outputs of both comparator 404 and comparator 405 are low. Under this condition, logic OR gate 406 supplies a low signal to D flip-flop 407, which then sets its output Vau low, the next time it gets clocked. The low value of Vau sets the current sense reference voltage, the voltage Vref-cs input of comparator 408 to the lower reference voltage Vref2. It is noted that, in FIG. 3, the output 116 of the controller, which drives the first switch 108, is also used as the clock signal for the D flip-flop 407. When current sense signal 114 reaches Vref-cs, control signal 116 at the output of comparator 408 switches off power switch 108 at the lower current level Vref2. When current sense signal 114 is compared with Vref2, the pulse width of control pulse signal 116 is narrower than pulse width of control pulse 116 when sense signal 114 is compared with reference Vref1. As a result, the frequency of power switch 108 is raised in order to maintain the target output. With the switching frequency raised, the audible noise can be suppressed.

At low load conditions, when the switching frequency of the power switch is increased, the duty-cycle of the Tons signal in FIG. 2 is raised up by a factor of Vref1/Vref2, and the voltage Vdtons is also raised by the same factor. Under this condition, Vload no longer represents the output load condition, unless it is scaled down by a factor of Vref1/Vref. For this purpose, resistors 305 and 306 are selected so that $K=(R306+R305)/R306=Vref1/Vref$, and Vload is properly scaled by resistors 305 and 306 as shown in FIG. 2 such that Vload is still representative of the load condition.

As described above, a low value of control signal Vau means that the conduction time of the first switch 108 is shortened and frequency is raised. The converter will stay in this state until the load gets heavier than the reference load corresponding to audible noise generation. When Vload increases and reaches reference voltage Vref4, comparator 404 generates a high voltage that is supplied to the D flip-flop 407 in FIG. 3. The next time the D flip-flop 407 gets clocked by signal 116, the output Vau of the D flip-flop 407 goes high. At this time, signal 116 also turns on of power switch 108. As shown in FIG. 3, a high value of Vau, which indicates the output being outside the audible noise generation range, selects the higher reference voltage Vref1 for the comparator 408 in FIG. 3. This high value of Vau also turns on the switch 307 in FIG. 2, setting $Vload=K*Vdtons$ to scale Vload to properly represent the output load.

Figure 4:
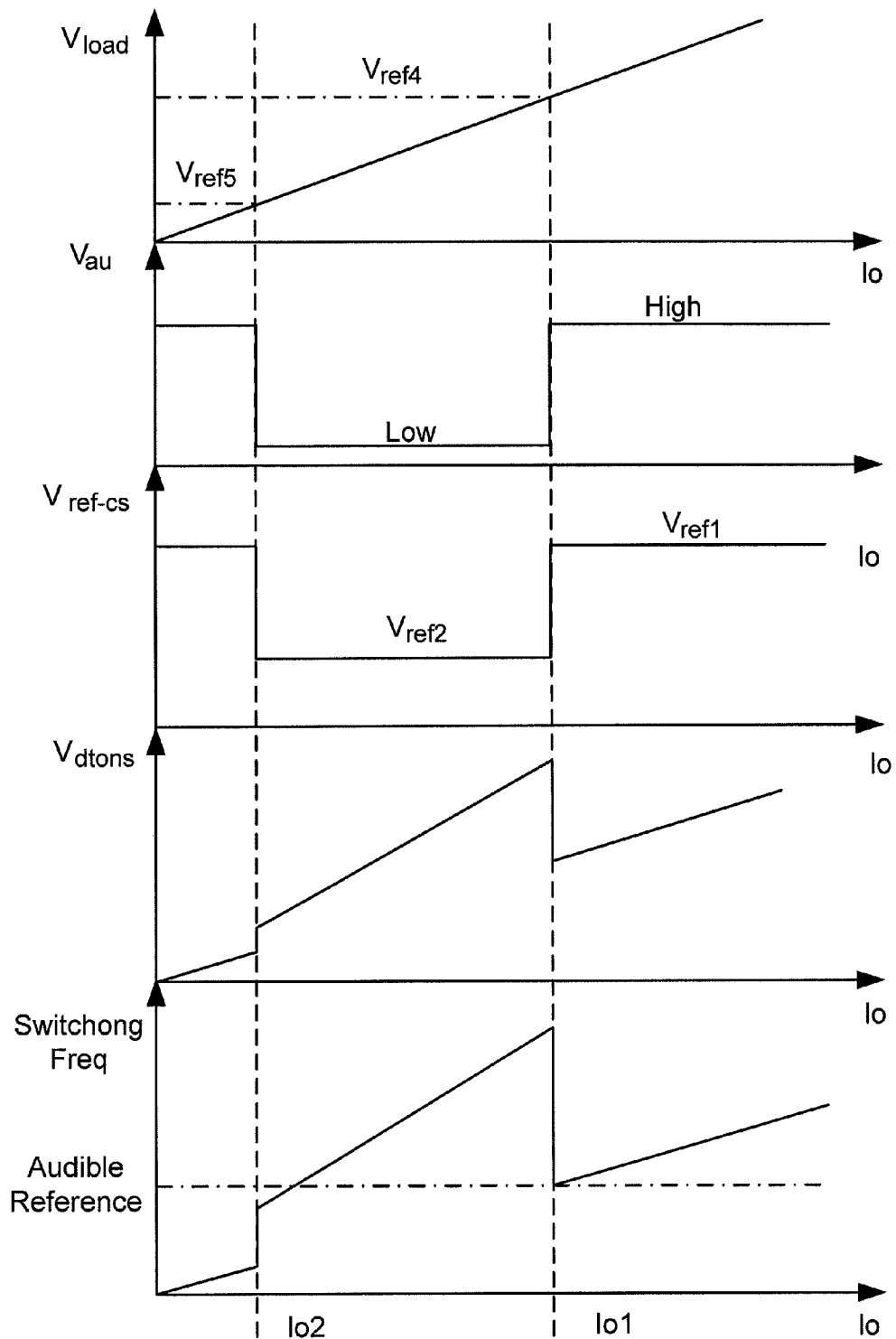
FIG. 4 illustrates various signals as functions of the load current in the power supply of FIG. 1.

The operation of the control circuit described above can also be illustrated in FIG. 4, which shows various signals as functions of the load current or output current Io of power supply 100 of FIG. 1. As shown in FIG. 4, a method for controlling a power converter includes determining a first signal, Vload, representing an output load of the power converter and raising the switching frequency of the power switch when Vload has dropped below the load reference level Vref4. In a specific embodiment, when Vload is below the load reference level Vref4, the switching frequency of the power switch, shown as "Switching Freq" in FIG. 4 is below a level at which audible noise is generated. When Vload is above Vref4, the current reference signal Vref1 is used for turning off the power switch. If Vload is below Vref4, current reference level Vref2 is used for turning off the power switch.

FIG. 4 also shows signal Vau described above, which represents the state of the output load, and a low value of Vau indicates the audio noise generation load range, corresponding to output current below Io1. As shown in FIG. 4, the switching frequency of the power switch, Switching Freq, is raised when Vload in the audible noise producing load range, i.e., when Vau is low. It is noted in FIG. 4 that, in some embodiments, the switching frequency is not raised under very light load conditions, even though the switching frequency may be in the audible range, as indicated by the high value of Vau below output level Io2. However, according to some embodiments of the invention, the relatively low noise may be acceptable, because the peak currents in the system are also low. As shown in FIG. 4, when Vload=Vdtons lowers to reference voltage Vref5, the load status signal Vau becomes high again, setting $Vload=k*Vdtons$ and selecting Vref-cs at Vref1. In this embodiment, a low standby power can be obtained.

While embodiments of the present invention are described with reference to specific examples, it is understood that the above description is for illustrative purposes only. Various modifications or changes in light thereof will be suggested to persons skilled in the art and are to be included within the spirit and purview of this application and scope of the appended claims.

What is claimed is:

1. A control circuit for controlling a power switch to regulate an output of a power converter, wherein the control circuit is configured to increase a switching frequency of the power switch when a first signal representing a magnitude of the output of the power converter is below a first output level, wherein, when the first signal representing the magnitude of the output of the power converter is above the first output level, the control circuit is configured to turn off the power switch if a second signal representing a current in the power switch is above a first reference level Vref1; and wherein, when the first signal is below the first output level, the control circuit is configured to turn off the power switch if the second signal is above a second reference level Vref2;

wherein the control circuit is configured to scale the first signal according to a ratio between Vref1 and Vref2 based on an internal signal, which is related to a comparison between the output of the power converter and the first output level, and is used to select Vref1 or Vref2.

2. The control circuit of claim 1, wherein, the first output level is selected such that when the first signal is below the first output level, the power converter may generate audible noise.

3. The control circuit of claim 1, further comprising a first circuit for generating a first signal representing a magnitude of the output of the power converter, the first circuit comprising:
 a first terminal for receiving a feedback signal associated with the output;
 a first comparator circuit for comparing the feedback signal with a feedback reference signal;
 an integrator circuit coupled to the output of the first comparator circuit for generating an analog signal; and
 a second comparator circuit coupled to the integrator circuit for providing the first signal representing a magnitude of the output of the power converter the second comparator circuit having:
  a first terminal for receiving the analog signal 1; and
  a second terminal for receiving a feedback signal from a voltage divider circuit that includes a first resistor and a second resistor coupled in series with a transistor controlled by a state signal which indicates that the switching frequency of the power switch needs to be raised.

4. The control circuit of claim 3, wherein the pulsed feedback signal is provided by an auxiliary winding coupled to an output winding in the power converter.

5. The control circuit of claim 3, wherein a ratio of the first reference level to the second reference level is equal to a ratio of (R1+R2)/R2, wherein R1 is the resistance of the first resistor and R2 is the resistance of the second resistor.

6. A control circuit for controlling a power switch to regulate an output of a power converter, wherein the control circuit is configured to increase a switching frequency of the power switch when a first signal representing a magnitude of the output of the power converter is below a first output level, wherein the first signal is scaled down in order to represent the magnitude of the output of the power converter,
 wherein the control circuit is configured to increase the switching frequency of the power switch, when the first signal representing a magnitude of the output of the power converter is below the first output level and above a second output level,
 wherein when the magnitude of the output of the power converter is below the first output level, the power converter is in an audible noise generation range, and the switching frequency of the power switch is increased to avoid the audible noise;
 wherein when the magnitude of the output of the power converter is below the second output level, the output is so low that the audible noise becomes acceptable, and the switching frequency of the power switch is not increased so as to maintain low standby power consumption.

7. The control circuit of claim 6, wherein, when the first signal representing the output of the power converter is above the first output level or below the second output level, the control circuit is configured to turn off the power switch if a second signal representing a current in the power switch is above a first reference level, the second output level being lower than the first output level; and
 wherein, when the first signal is below the first output level and above the second output level, the control circuit is configured to turn off the power switch if the second signal is above a second reference level, the second reference level being lower than the first reference level.

8. A control circuit for controlling a power switch to regulate an output of a power converter, wherein the control circuit is configured to increase a switching frequency of the power switch when a first signal representing a magnitude of the output of the power converter is below a first output level, wherein the control circuit further comprises a first circuit for generating the first signal representing a magnitude of the output of the power converter, the first circuit including:
 a first terminal for receiving a feedback signal associated with the output;
 a first comparator circuit for comparing the feedback signal with a feedback reference signal;
 an integrator circuit coupled to the output of the first comparator circuit for generating an analog signal; and
 a second comparator circuit coupled to the integrator circuit for providing the first signal representing a magnitude of the output of the power converter the second comparator circuit having:
  a first terminal for receiving the analog signal 1; and
  a second terminal for receiving a feedback signal from a voltage divider circuit that includes a first resistor and a second resistor coupled in series with a transistor controlled by a state signal which indicates that the switching frequency of the power switch needs to be raised.

9. The control circuit of claim 8, wherein the pulsed feedback signal is provided by an auxiliary winding coupled to an output winding in the power converter.

10. The control circuit of claim 8, wherein a ratio of the first reference level to the second reference level is equal to a ratio of (R1+R2)/R2, wherein R1 is the resistance of the first resistor and R2 is the resistance of the second resistor.

* * * * *